May 10, 1960 V. F. DE VOST 2,935,960
SHOCK DIRECTION INDICATOR
Filed Dec. 8, 1958

INVENTOR.
VALMORE F. DE VOST

BY
ATTORNEYS.

_United States Patent Office_ 2,935,960
Patented May 10, 1960

2,935,960

SHOCK DIRECTION INDICATOR

Valmore F. De Vost, Silver Spring, Md., assignor to the United States of America as represented by the Secretary of the Navy Application December 8, 1958, Serial No. 779,035

4 Claims. (Cl. 116—114)

(Granted under Title 35, U.S. Code (1952), sec. 266)

The invention described herein may be manufactured and used by or for the Government of the United States of America for governmental purposes without the payment of any royalties thereon or therefor.

This invention relates to recording devices and more particularly to a device for recording the intensity and direction in which shock occurs when the device is secured to a test object to which the shock is applied.

It has been the usual practice heretofore when recording the direction of shock suddenly applied to an ordnance device, for example, to employ continuous reading accelerometers or alternatively high-speed photography to obtain a record of the shock. Peak reading accelerometers are not particularly well suited for determining the direction of shock for the reason that they are designed primarily to read peak shock only. Although high speed photography can record the angle at which an ordnance device, for example, strikes a target, in many cases the cameras are too far away from the point of action to do so with a high degree of accuracy. Furthermore, once the ordnance device disappears out of view such as in water entry or target penetration, for example, the camera cannot always follow such action. Such methods require complex, expensive and bulky equipment and require skilled operators.

The shock direction indicator of the present invention possesses all of the advantages of the prior art devices and none of the foregoing disadvantages. In accordance with the present invention the device comprises a plurality of steel balls fluidly suspended around a grease filled cylindrical chamber and moveable from an initial position of rest through the grease in accordance with the direction and intensity of the shock received, the degree of such movement being made manifest by the final position of the balls when viewed through a transparent cylindrical chamber wall within which the balls are enclosed. A coating of dye material about the balls of a color different from the color of the grease leaves a trace whereby the path of movement of the balls from the initial position of rest thereof to the final position of the balls is made clearly manifest.

One of the objects of the present invention is the provision of a shock direction recorder which is inexpensive to manufacture, simple in construction, compact and possesses the qualities of reliability in operation.

Another object is the provision of a new and improved shock direction recorder suitable for use with unskilled personnel in which the direction of the shock is made clearly manifest without the use of additional recording or control equipment.

A still further object is the provision of a new and improved shock direction indicator which is compact and in which the recording element is contained therein.

Still other objects, advantages and improvements will be apparent from the following description taken in connection with the accompanying drawing of which:

Figure 1:
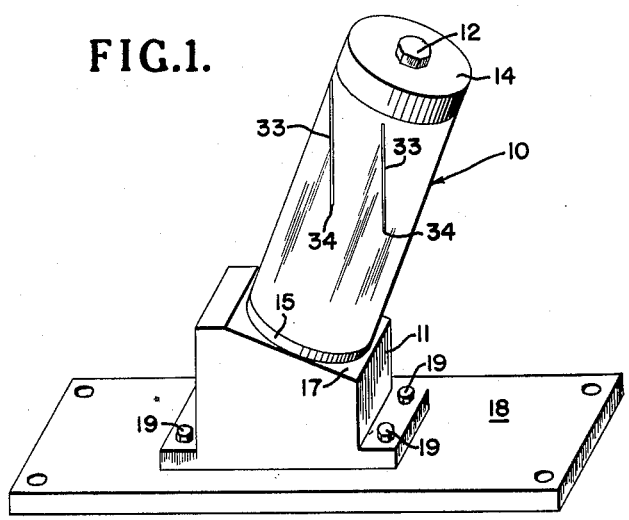
Fig. 1 is a view in perspective of a shock direction indicator in accordance with a preferred form of the invention.
Figure 2:
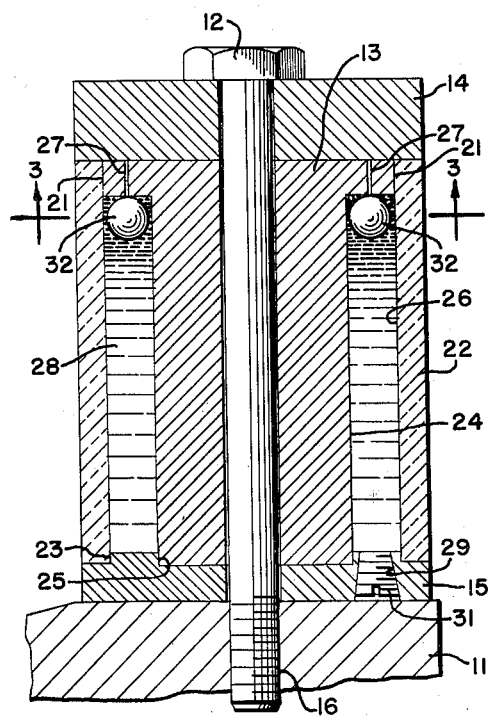
Fig. 2 is an elevational view in section somewhat enlarged of the device of Fig. 1.
Figure 3:
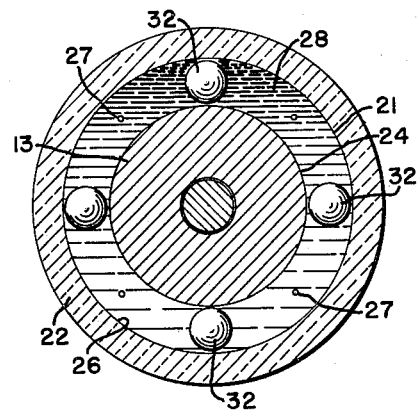
Fig. 3 is a view of the device taken along line 3—3 of Fig. 2.

Referring now to the drawing on which like numerals of reference are employed to designate like parts and more particularly to Fig. 1 thereof, there is shown thereon a shock direction indicator indicated generally by the numeral 10 and secured to a base 11 by a bolt 12 passing through a metallic core 13 generally circular in configuration and a pair of end closing members 14 and 15, respectively, Fig. 2. The bolt 12 is threaded into the base 11 at 16 and is employed to maintain the indicator 10 tightly and rigidly clamped thereto. The base 11 is provided preferably with a surface 17 formed thereon and at an angle with reference to the surface of a plate 18 through which the base is secured as by the bolts 19.

The core 13 is provided with an outer cylindrical surface 21 adapted to receive and engage the inner cylindrical surface of a transparent sleeve 22 composed of material suitable for the purpose such, for example, as Lucite and an end portion thereof, the other end portion of the interior cylindrical surface of the sleeve being engaged by a shoulder 23 formed on the end closing member 15. The core 13 is also provided with a cylindrical surface 24 substantially as shown, the end portion of the surface fitting within a shallow bore 25 formed within the closing member 15 to maintain the core coaxial with the sleeve at all times even though subjected to a severe shock having a component at an angle with respect to the axis of the sleeve. A chamber 26 is thus formed between the core and the sleeve 22 of elongated annular configuration having uniform cross-sectional area throughout the length thereof, the upper end of the chamber, as viewed on the drawing, being provided with a plurality of apertures 27 at the upper end thereof of small size to permit filling of the chamber 26 with a quantity of grease 28 through tapped hole 29, the hole thereafter being sealed by plug 31. A plurality of steel balls 32 are placed within the chamber 26 in uniform spaced relation in such manner that the balls are positioned in mutual spaced relationship at the upper end of the chamber when the chamber has been filled with grease, the air escaping through apertures 27 during the grease filling operation. Each ball is coated with a greasy dye such, for example, as Prussian blue prior to insertion within the chamber 26 thereby to leave a visible trace such, for example, as the traces 33 illustrated on Fig. 1 after a sudden shock has been applied to the device.

After the chamber 26 has been filled with grease and the balls properly positioned therein, the plug 31 is threaded into the tapped hole 29 thereby sealing the chamber against the escape of grease and the closure member 14 is assembled thereon and the entire device is clamped to the base 11 by the bolt 12. The balls, it will be noted, are of slightly less diameter than the radial distance between the cylindrical surfaces defining the chamber 26 whereby the balls may move within the chamber through the grease in response to a sudden shock applied thereto.

The operation of the device will now be described with particular reference to Fig. 1 in which the device is clamped securely to a base 11 at an angle with respect to a plate 18 and the plate 18 is securely bolted to an object such, for example, as a mine to be tested. Let it further be assumed that the balls are at the top portion of the device prior to testing. If the mine is dropped upon a target surface in such manner that the plate 18 is normal to the direction of the shock received by the device, the balls 32 will be moved through the grease from their initial positions of rest to the positions shown, by way of example, at 34 leaving a plurality of colored traces 33 in the grease as a record of the direction of the shock received by the device and the strength of the shock.

When the mine is disassembled and the device removed therefrom the traces 33 of the balls within the grease are made clearly manifest.

Although the device has been shown clamped to the plate 18 in a tilted position, its use is not so limited as it may be clamped to the plate or to the object to be tested either with the axis thereof parallel to the axis of the ordnance device to which it is secured or at any other desired angle with respect thereto. Furthermore, although described with particularity with respect to an ordnance device, it is not so limited as it may be employed with parachute stores or other devices advantageously to record the intensity and direction of impact received thereby as the device strikes a target area.

While the invention has been described with reference to a particular example which gives satisfactory results, it is not so limited as various changes and modifications may be made without departing from the spirit and scope of the invention and it is intended, therefore, in the appended claims to cover all such changes and modifications.

What is claimed as new and desired to be secured by Letters Patent of the United States is:

1. A shock direction indicator for recording the direction of a shock suddenly applied thereto comprising a grease filled cylindrical chamber having an inner cylindrical wall and an outer cylindrical wall composed of transparent material, a plurality of steel balls disposed within one end of said chamber and fluidly suspended therein by said grease, each of said balls having a diameter slightly less than the radial distance between the inner and outer cylindrical walls of said chamber and being coated with a greasy dye different in color from said grease and adapted to move through said grease as a shock is received and leave a visible trace on the transparent cylindrical wall.

2. A shock direction indicator according to claim 1 in which means are provided for filling said chamber with grease.

3. A shock direction indicator for recording the direction of a shock suddenly applied thereto comprising a metallic cylindrical core having a transparent sleeve fitted externally thereto, said core having a cylindrical portion of reduced diameter forming a cylindrical sleeve-like chamber throughout substantially the length thereof, a plurality of steel balls within said chamber and moveable therein, a quantity of grease filling said chamber and fluidly supporting the balls initially in uniform mutually spaced relation at one end thereof, means sealing said grease within the chamber, and means clamping said core and sleeve in tightly assembled relation, said last named means comprising a rigid base element to which the indicator is clamped, said balls each being coated with a greasy dye of distinctive coloration with respect to said grease thereby to leave a plurality of visible traces on said transparent sleeve indicative of the direction and character of the shock applied thereto.

4. An indicator according to claim 3 including a bolt threaded into said base and a closure member disposed between the head of the bolt and said core and sleeve.

References Cited in the file of this patent

UNITED STATES PATENTS

| | | |
|---|---|---|
| 2,454,793 | Grogan | Nov. 30, 1948 |
| 2,523,474 | Mason | Sept. 26, 1950 |